July 15, 1969 W. L. BLACK 3,456,198

IMPULSE NOISE CANCELLATION

Filed Nov. 1, 1966

INVENTOR
WILLIAM L. BLACK
BY Irving S. Rappaport
AGENT

United States Patent Office
3,456,198
Patented July 15, 1969

3,456,198
IMPULSE NOISE CANCELLATION
William L. Black, Cambridge, Mass., assignor to Raytheon Company, Lexington, Mass., a corporation of Delaware
Filed Nov. 1, 1966, Ser. No. 591,324
Int. Cl. H04b *1/10*
U.S. Cl. 325—475 11 Claims

ABSTRACT OF THE DISCLOSURE

Means for cancelling impulse noise in communication channels comprising an upper, middle, and lower channel. A signal having a center frequency $(\omega+\epsilon)$ passes through the upper channel, a subtractor, and the output filter. An impulse, however, causes each channel to ring, the upper channel with a frequency $(\omega+\epsilon)$, the middle channel with a frequency $\omega$ which is then doubled, and the lower channel with a frequency $(\omega-\epsilon)$. The ringing in the middle and lower channels is applied to a multiplier whose output and the upper channel ringing are then applied to a substrator where they are cancelled, thus eliminating the impulse.

The present invention relates to an impulse noise cancellation system and, more particularly, an impulse noise cancellation system which may be employed for cancelling noise in channels of a communication system. In a multi-channel communication system many useful communication channels are limited in their use because of impulse noise. The prior art contains various methods for eliminating impulse noise. An object of the present invention is to provide an improved impulse noise cancellation system.

Another object of the present invention is to provide an improved impulse noise cancellation system for use with a multichannel communication system.

The above objects and advantages of the present invention are achieved by providing an impulse noise cancellation system comprising a plurality of input filtering means which rings upon receipt of an impulse, frequency doubling means for doubling the frequency of the output of one of the input filtering means, and combining means for multiplying the frequency doubled output and the output from a second of the input filtering means and for subtracting the multiplied output and the output from a third of the input filtering means whereby signal cancellation occurs and the impulse is eliminated.

Other objects and advantages of the invention will hereinafter become more fully apparent from the following description of the annexed drawings, which illustrate a preferred embodiment and wherein.

Figure 1:
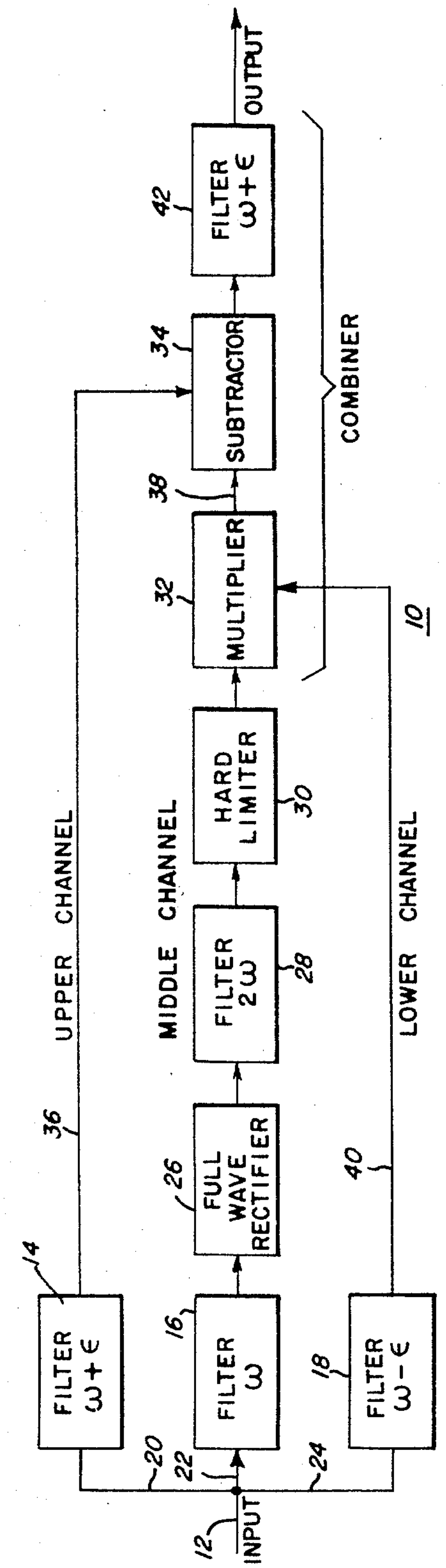
FIG. 1 illustrates an embodiment of the present invention.

FIG. 1 is a block diagram of an impulse noise cancellation system 10 of the present invention. An incoming signal to the system is fed in via input line 12 which feeds three input filters 14, 16 and 18 via lines 20, 22 and 24, respectively. The incoming signal has a bandwidth (all frequencies are in radians per second) and center frequency +. The output of filter 16 is fed to a full wave rectifier 26 whose output is fed to a filter 28. The full wave rectifier 26 and filter 28 acts as a frequency doubler whose output is fed to a hard limiter 30 which limits the signal which is then connected to the input of a multiplier 32. A hard limiter is a limiter which has a great deal of gain and whose output is extremely flat-topped. Such a limiter acts as an infinite clipper as all amplitude effects are removed so that the output is only zero signal crossings. A hard limiter differs from a soft limiter in that a soft limiter only rounds the signal impulses instead of acting as an infinite clipper.

The outputs from filter 14 and multiplier 32 are fed to a subtractor 34 via lines 36 and 38, respectively. The multiplier 32 in addition to being fed by the output from hard limiter 30 is also fed from the output of filter 18 via line 40 where the signals are combined and fed to the subtractor 34 via line 38. After the resultant signals are subtracted by subtractor 34 the output is fed to an output filter 42. The output from filter 42 represents the impulse noise cancelled signal.

For purposes of description the impulse noise cancellation system 10 is divided into three channels—an upper channel, a middle channel, and a lower channel. The upper channel is made up of input line 20, input filter 14 and line 36 which connects the output of filter 14 to the subtractor 34. The middle channel includes input line 22 connected to the input of filter 16, full wave rectifier 26, filter 28, and hard limiter 30. The lower channel is made up of input line 24, filter 18 and line 40 which feeds the output of filter 18 to the multiplier 32. The output portion of the system 10 may be termed a combiner, which includes multiplier 32 whose output is fed to subtractor 34 via line 38 and output filter 42.

The operation of the present invention shown in FIG. 1 is as follows: The incoming signal having bandwidth $\epsilon$ and center frequency $\omega+\epsilon$ coming through the input line 12 is fed to parallel-connected filters 14, 16 and 18 via lines 20, 22 and 24, respectively. Any narrow-band signal with center frequency $\omega$ can be expressed as A cos $(\omega t+\phi)$ where A and $\phi$ are slowly varying. The signal path is linear and there is no interaction between the signal and the noise. The noise path, however, is nonlinear. Since any signal is a supper-position of impulses, no linear system can cancel impulses and still pass a signal.

When a noise impulse strikes the system 10, the three channel filters 14, 16 and 18 will ring. Ringing is a damped oscillation in the output signal of a system which occurs as a result of a sudden change in the input signal. Filters 14, 16 and 18 all have bandwidth $\epsilon$. Filter 14 rings at a center frequency of $\omega+\epsilon$, filter 16 rings at a center frequency of $\omega$ and filter 18 rings at a center frequency of $\omega-\epsilon$. The impulse responses of each of the channel filters 14, 16 and 18 is respectively:

Flter 14 impulse response $=A_1 \cos(\omega+\epsilon)t+\phi_1$
Filter 16 impulse response $=A_2 \cos \omega t+\phi_2$
Filter 18 impulse response $=A_3 \cos(\omega-\epsilon)t+\phi_3$ where $A_1$, $A_2$, $A_3$, $\phi_1$, $\phi_2$ and $\phi_3$ are slowly varying. The full wave rectifier 26 and filter 28 which is centered at frequency $2\omega$ act as a frequency doubler. As a result of the frequency doubling, the input to the hard limiter 30 is:

$$\text{Input to limiter } 30=\frac{4}{3\pi}[A_2] \cos 2\omega t+2\phi_2$$

The output of limiter 30 has the following component:

$$\text{Limiter 30 output}=\frac{4}{\pi} \cos 2\omega t+2\phi_2$$

at frequency $2\omega$. The $2\omega$ frequency oscillation of the middle channel is used to translate the lower channel ring of frequency $\omega-\epsilon$ to the same frequency as the upper channel ring $\omega+\epsilon$. The output from the hard limiter 30 and the output from the filter 18 are combined in the multiplier 32 whose output then has a component at frequency $\omega+\epsilon$ of:

$$\text{Multiplier 32 output}=\frac{2}{\pi} A_3 \cos(\omega+\epsilon)T+2\phi_2-\phi_3$$

The output from the multiplier 32 and the output from the upper channel filter 14 are subtracted in subtractor 34. The output from subtractor 34 is fed through output filter 42 which is centered at frequency $\omega+\epsilon$. The translated lower channel ring cancels the upper channel ring and total noise cancellation occurs if:

$$\frac{2}{\pi}A_3=A_1 \quad 2\phi_2=\phi_1+\phi_3$$

If the arrival rate of impulse disturbances is too high the system fails, since as mentioned before, no non-linear system can cancel impulses occurring arbitrarily close together. The reason for such failure is that tails from past impulse rings introduce an uncertainty in the phase of the middle channel filter output. A tail is the end portion of the previous impulse signal which has not been completely damped out prior to initiation of the next impulse. To avoid such failure, the minimum impulse separation must be approximately equal to the reciprocal of the middle channel filter bandwidth. By widening the middle channel, the minimum impulse separation can be reduced. However, such change increases the error due to the difference in propogation of various frequencies from the noise source to the receiver and maximum impulse width is reduced.

To estimate the effect of a pulse width, $2\tau$, on the system, assume an excitation:

$$\tfrac{1}{2}\delta(t+\tau)+\tfrac{1}{2}\delta(t-\tau)$$

where $\delta$ is the impulse function. This models a pulse of width $2\tau$ by a pair of impulses separated by $2\tau$. The outputs of the three channel filters 14, 16 and 18 are then respectively:

Filter 14—$A_1 \cos(\omega+\epsilon)\tau \cos(\omega+\epsilon)t+\phi_1$
Filter 16—$A_2 \cos \omega\tau \cos \omega t+\phi_2$
Filter 18—$A_3 \cos(\omega-\epsilon)\tau \cos(\omega-\epsilon)t+\phi_3$ As shown above, both an amplitude and a phase condition must be met for a total noise cancellation. Therefore, increasing $\tau$ from 0 does not disturb the phase relation but does affect the amplitude relation. For effective cancellation:

$$\text{Cos}\,(\omega+\epsilon)\tau\simeq \cos(\omega-\epsilon)\tau \text{ or } 2\epsilon\tau\ll 2\pi$$

Thus the maximum pulse width is approximately equal to the reciprocal of the upper and lower channel separation.

Figure 2:
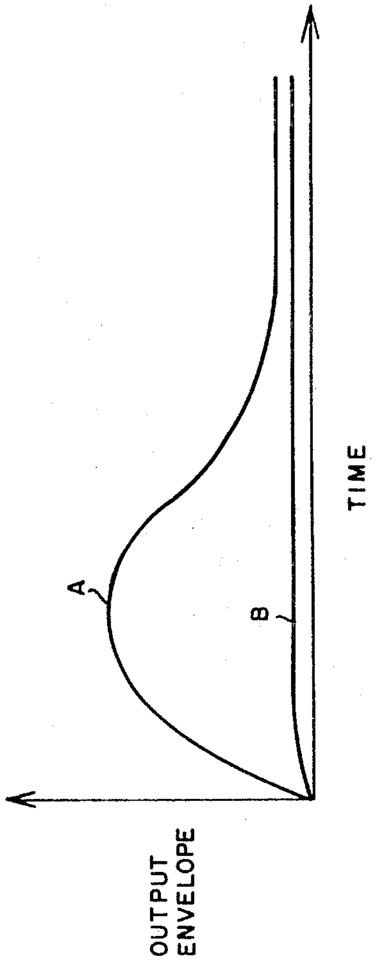
FIG. 2 is a graph of the response of the present invention.

FIG. 2 illustrates a comparison of the response to the impulse, both with and without noise cancellation. The output envelope is plotted against time and curve A shows the envelope of "ring" with the cancelling channel disabled. Curve B shows the output envelope after cancelling has taken place. It is obvious from these curves that without the employment of the cancelling channels of the present invention, the amplitude of the output envelope is substantially increased due to the impulse noise introduced into the signal.

The filters and components used in the present invention are standard components such as those which are described in a reference such as Ryder, "Electronic Fundamentals and Applications."

It should be understood, of course, that the foregoing disclosure relates to only a preferred embodiment of the invention and that numerous modifications or alterations may be made therein without departing from the spirit and scope of the invention as set forth in the appended claims.

I claim:

1. An impulse noise cancellation system comprising:
a plurality of input filtering means which rings upon receipt of an impulse;
frequency doubling means for doubling the frequency of the output of one of said input filtering means; and
combining means for multiplying said frequency doubled output and the output from a second of said input filtering means and for subtracting the multiplied output and the output from a third of said input filtering means, whereby signal cancellation occurs and the impulse is eliminated.

2. An impulse noise cancellation system comprising:
a plurality of input filtering means which rings upon receipt of an impulse;
frequency doubling means for doubling the frequency of the output of one of said input filtering means;
multiplying means for multiplying said frequency doubled output and the output from a second of said input filtering means; and
subtracting means for subtracting the output from the multiplying means and the output from a third of said input filtering means, whereby signal cancellation occurs and the impulse is eliminated.

3. An impulse noise cancellation system as set forth in claim 2 wherein:
said plurality of input filtering means includes an upper channel filter designed to ring at a frequency $\omega+\epsilon$, a middle channel filter designed to ring at a frequency $\omega$ and a lower channel filter designed to ring at a frequency $\omega-\epsilon$.

4. An impulse noise cancellation system as set forth in claim 3 wherein:
said middle channel ringing frequency $\omega$ is doubled by said doubling means.

5. An impulse noise cancellation system as set forth in claim 3 wherein:
said multiplying means multiplies said doubled frequency $2\omega$ output and the output from said lower channel filter.

6. An impulse noise cancellation system as set forth in claim 3 wherein:
said subtracting means substracts the output from said multiplying means and the output from said upper channel filter.

7. An impulse noise cancellation system as set forth in claim 2 wherein:
said plurality of input filtering means includes an upper channel filter designed to ring at a frequency of $\omega+\epsilon$, a middle channel filter designed to ring at a frequency $\omega$ and a lower channel filter designed to ring at a frequency $\omega-\epsilon$;
said middle channel ringing frequency $\omega$ being doubled by said doubling means; and
said multiplying means multiplies said doubled frequency $2\omega$ output an the output from said lower channel filter; and
said subtracting means subtracts the output from said multiplying means and the output from said upper channel filter.

8. An impulse noise cancellation system for employment with a communication system comprising:
an upper channel including a filtering means which rings at a frequency of $\omega+\epsilon$ upon receipt of an impulse;
a middle channel including a filtering means which rings at a frequency of $\omega$ upon receipt of an impulse;
a lower channel including a filtering means which rings at a frequency of $\omega-\epsilon$ upon receipt of an impulse;
a frequency doubling means for doubling the middle channel frequency ringing;
multiplying means for multiplying said frequency doubled output of said middle channel and the output from said lower channel filtering means; and
subtracting means for subtracting the output from said multiplying means and the output from said upper channel filtering means, whereby the system passes a signal with center frequency $\omega+\epsilon$ through the upper channel and the subtracting means and eliminates any impulse.

9. An impulse noise cancellation system as set forth in claim 8 wherein:
said frequency doubling means includes a full wave rectifier and a filter which doubles the output ringing at frequency $\omega$ from the middle channel filtering means to a frequency of $2\omega$.

10. An impulse noise cancellation system as set forth in claim 8 wherein:

said middle channel includes said frequency doubling means and a limiting means for limiting the output from said frequency doubling means.

11. An impulse noise cancellation system for employment with a communication system comprising:

an upper channel including a filter which rings at a frequency of $\omega+\epsilon$ upon receipt of an impulse;

a middle channel including one filter which rings at a frequency of $\omega$ upon receipt of an impulse, a frequency doubler including a full wave rectifier and another filter for doubling the output ringing frequency $\omega$ from said one filter to a frequency of $2\omega$, and a limiter for limiting the output from said frequency doubler;

a lower channel including a filter which rings at a frequency of $\omega-\epsilon$ upon receipt of an impulse;

a multiplier connected to said limited output and said lower channel filter output for multiplying the frequency doubled output of said middle channel and the output from said lower channel filter;

a subtractor connected to said multiplier output and to said upper channel filter output for subtracting the multiplier output and the output from the upper channel filter; and an output filter connected to the output of said subtractor, whereby the system passes a signal with center frequency $\omega+\epsilon$ through the upper channel, the subtractor and the output filter and eliminates any impulse.

References Cited

UNITED STATES PATENTS 3,374,435 3/1968 Engel ............... 325—324

KATHLEEN H. CLAFFY, Primary Examiner

D. L. RAY, Assistant Examiner

U.S. Cl. X.R.

325—324